US011955069B2

(12) United States Patent
An et al.

(10) Patent No.: US 11,955,069 B2
(45) Date of Patent: Apr. 9, 2024

(54) DISPLAY DEVICE AND METHOD OF DRIVING THE SAME

(71) Applicant: Samsung Display Co., Ltd., Yongin-si (KR)

(72) Inventors: Jungeon An, Asan-si (KR); Kihyun Pyun, Gwangmyeong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/096,795

(22) Filed: Jan. 13, 2023

(65) Prior Publication Data

US 2023/0386401 A1 Nov. 30, 2023

(30) Foreign Application Priority Data

May 27, 2022 (KR) ........................ 10-2022-0065399

(51) Int. Cl.
*G09G 3/3208* (2016.01)

(52) U.S. Cl.
CPC ... *G09G 3/3208* (2013.01); *G09G 2320/0233* (2013.01); *G09G 2320/0257* (2013.01); *G09G 2320/0271* (2013.01); *G09G 2330/021* (2013.01)

(58) Field of Classification Search
None
See application file for complete search history.

(56) References Cited

U.S. PATENT DOCUMENTS

2011/0298818 A1* 12/2011 Mori .................... G09G 3/3208 345/589
2019/0213953 A1* 7/2019 Koh .................... G09G 3/3233
2020/0143751 A1* 5/2020 Byun .................... G09G 3/3291
2021/0264877 A1* 8/2021 Pyun .................... G09G 3/3233
2021/0327338 A1* 10/2021 Park .................... G09G 3/3233
2021/0335273 A1* 10/2021 Meng .................... G09G 3/3208
2022/0198998 A1* 6/2022 Park .................... G09G 3/2007
2023/0122681 A1* 4/2023 Park .................... G09G 3/3233 345/690

(Continued)

FOREIGN PATENT DOCUMENTS

KR 100497344 B1 9/2005
KR 100703738 B1 4/2007
KR 102007369 B1 8/2019

(Continued)

*Primary Examiner* — Amare Mengistu
*Assistant Examiner* — Sarvesh J Nadkarni
(74) *Attorney, Agent, or Firm* — CANTOR COLBURN LLP

(57) ABSTRACT

A display device includes a first gain provider which controls a first gain value during a first display period in which a still image is displayed, a second gain provider which controls a second gain value during a second display period in which a moving image including a still area is displayed, and a grayscale converter which applies the first gain value or the second gain value to an input image and generates an output image. The first gain provider linearly or exponentially increases the first gain value to a maximum gain value based on a load of the still image from a first time point when the second display period changes to the first display period to a second time point at which the first gain value starts to decrease from the maximum gain value.

20 Claims, 7 Drawing Sheets

(56) References Cited

U.S. PATENT DOCUMENTS

| | | | | |
|---|---|---|---|---|
| 2023/0245615 | A1* | 8/2023 | Lee | G09G 3/3233<br>345/55 |

FOREIGN PATENT DOCUMENTS

| | | | |
|---|---|---|---|
| KR | 102276652 | B1 | 7/2021 |
| KR | 1020210106626 | A | 8/2021 |
| KR | 1020210129310 | A | 10/2021 |

* cited by examiner

DISPLAY DEVICE AND METHOD OF DRIVING THE SAME

This application claims priority to Korean Patent Application No. 10-2022-0065399, filed on May 27, 2022, and all the benefits accruing therefrom under 35 U.S.C. § 119, the content of which in its entirety is herein incorporated by reference.

BACKGROUND

1. Field

Embodiments relate to a display device. More particularly, embodiments relate to a display device applied to various electronic apparatuses and a method of driving the same.

2. Description of the Related Art

As information technology develops, an importance of a display device, which is a connection medium between a user and information, is increasing. Accordingly, a use of display devices such as a liquid crystal display device, an organic light-emitting display device, or the like is increasing.

The display device may determine whether an input image is a still image or a moving image by comparing input images of successive frames. When the display device displays the still image or the moving image including a still area, a screen saver function that decreases a luminance of an image may be used, so that an afterimage of the display device may be prevented, and power consumption of the display device may be reduced.

SUMMARY

Embodiments provide a display device for reducing power consumption and improving image quality and a method of driving the display device.

A display device in an embodiment of the disclosure includes a first gain provider which controls a first gain value during a first display period in which a still image is displayed, a second gain provider which controls a second gain value during a second display period in which a moving image including a still area is displayed, and a grayscale converter which applies the first gain value or the second gain value to an input image to generate an output image. The first gain provider linearly or exponentially increases the first gain value to a maximum gain value based on a load of the still image from a first time point when the second display period changes to the first display period to a second time point at which the first gain value starts to decrease from the maximum gain value.

In an embodiment, the first gain provider may linearly increase the first gain value from the first time point to the second time point when the load of the still image is less than or equal to a reference load. The first gain provider may exponentially increase the first gain value from the first time point to the second time point when the load of the still image is greater than the reference load.

In an embodiment, the first gain provider may calculate the first gain value from the first time point to the second time point by Equation 1:

$$SSG1=SSG2\_T1+(SSG1\_M-SSG2\_T1)*(P0/P1)^{\alpha} \quad \text{[Equation 1]}$$

where SSG1 denotes the first gain value at a current time point, SSG2_T1 denotes the second gain value at the first time point, SSG1_M denotes the maximum gain value, P0 denotes a period from the first time point to the current time point, P1 denotes a period from the first time point to the second time point, and $\alpha$ denotes a real number greater than or equal to 1.

In an embodiment, the first gain provider may determine the $\alpha$ to be larger as the load of the still image increases.

In an embodiment, the maximum gain value may be 1.

In an embodiment, the first gain provider may include a still image determiner which determines whether the input image is the still image, and a first gain determiner which determines the first gain value from the first time point to the second time point.

In an embodiment, the still image determiner may include a load comparator which calculates a load difference between a load of the input image in a previous frame and a load of the input image in a current frame, a motion detector which detects a motion of the input image based on the load difference, and a still image counter which increases a still image count when the motion of the input image is less than a reference motion.

In an embodiment, the first gain determiner may include an $\alpha$ determiner which determines the $\alpha$ based on the load of the input image, a threshold count memory which stores a threshold count for determining the second time point, and a first gain calculator which calculates the first gain value at the current time point based on the Equation 1.

In an embodiment, the first gain provider may linearly decrease the first gain value from the second time point to a third time point at which the first gain value is equal to a threshold gain value.

In an embodiment, the first gain provider may maintain the first gain value as the threshold gain value from the third time point.

In an embodiment, the second gain provider may determine the second gain value based on a difference between an average gray scale value in the still area and an average grayscale value in a peripheral area surrounding the still area and a load of the moving image.

In an embodiment, the second gain provider may determine the second gain value to be smaller as the difference between the average grayscale value in the still area and the average grayscale value in the peripheral area increases.

In an embodiment, the second gain provider may determine the second gain value to be smaller as the load of the moving image decreases.

A method of driving a display device controlling a first gain value during a first display period in which a still image is displayed and controlling a second gain value during a second display period in which a moving image including a still area is displayed in embodiments may include linearly or exponentially increasing the first gain value to a maximum gain value based on a load of the still image from a first time point when the second display period changes to the first display period to a second time point at which the first gain value starts to decrease from the maximum gain value, and applying the first gain value or the second gain value to an input image to generate an output image.

In an embodiment, the first gain value may linearly increase from the first time point to the second time point when the load of the still image is less than or equal to a reference load. The first gain value may exponentially increase from the first time point to the second time point when the load of the still image is greater than the reference load.

In an embodiment, the first gain value from the first time point to the second time point may be calculated by Equation 1:

$$SSG1=SSG2\_T1+(SSG1\_M-SSG2\_T1)*(P0/P1)^{\alpha} \quad \text{[Equation 1]}$$

where SSG1 denotes the first gain value at a current time point, SSG2_T1 denotes the second gain value at the first time point, SSG1_M denotes the maximum gain value, P0 denotes a period from the first time point to the current time point, P1 denotes a period from the first time point to the second time point, and α denotes a real number greater than or equal to 1.

In an embodiment, the α may be determined to be larger as the load of the still image increases.

In an embodiment, the method may further include linearly decreasing the first gain value from the second time point to a third time point at which the first gain value is equal to a threshold gain value.

In an embodiment, the method may further include maintaining the first gain value as the threshold gain value from the third time point.

In an embodiment, the method may further include determining the second gain value based on a difference between an average grayscale value in the still area and an average grayscale value in a peripheral area surrounding the still area and a load of the moving image.

In the display device and the method of driving the display device in the embodiments, when a load of the still image is large, the first gain value may exponentially increase to the maximum gain value from the first time point when a period in which the moving image including the still area is displayed changes to a period in which the still image is displayed to the second time point at which the first gain value starts to decrease from the maximum gain value, so that power consumption of the display device may be reduced. Further, the still image may have an original luminance at the second time point, so that image quality of the still image may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
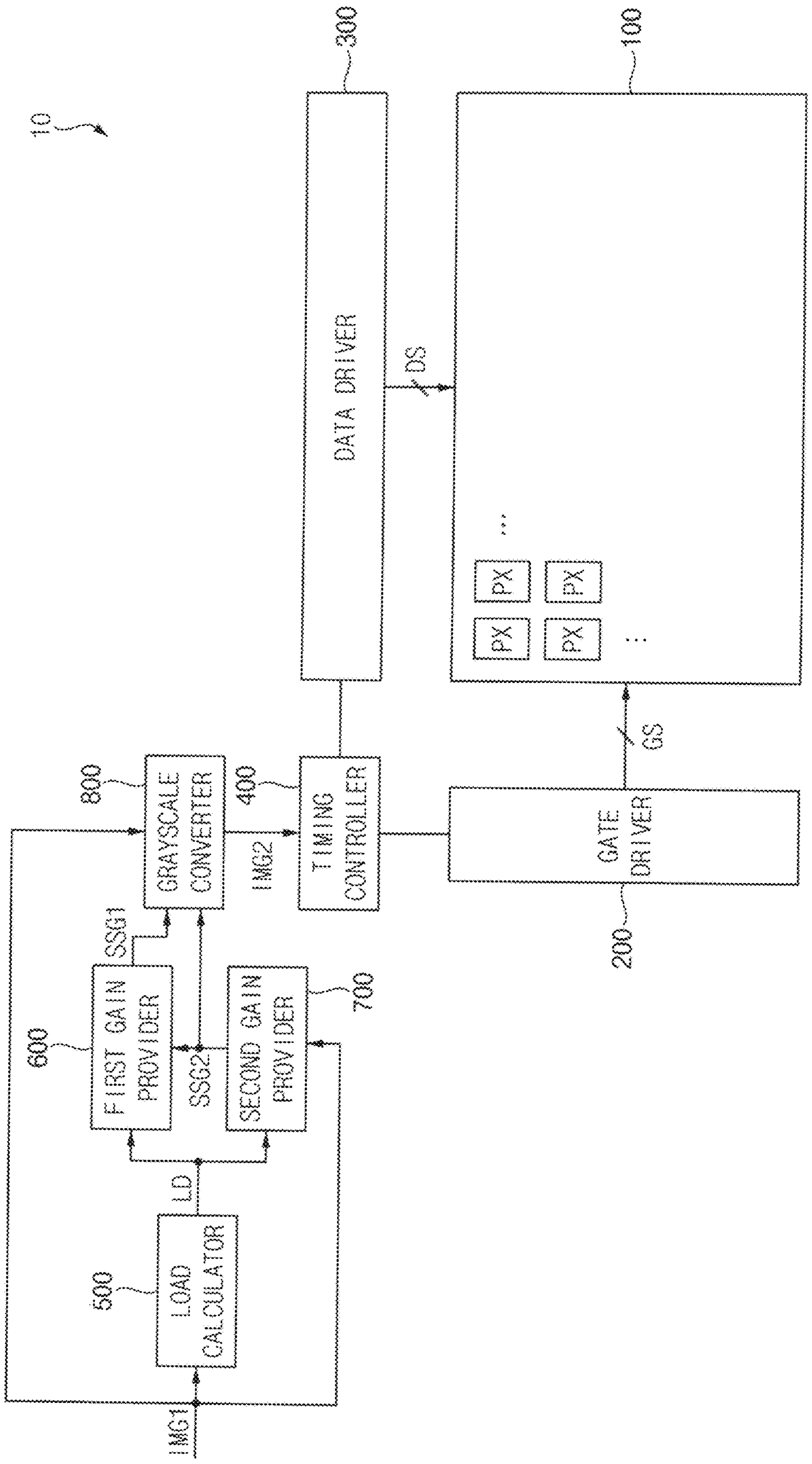
FIG. 1 is a block diagram illustrating an embodiment of a display device.

Hereinafter, a display device and a method of driving a display device in embodiments of the disclosure will be described in more detail with reference to the accompanying drawings. The same or similar reference numerals will be used for the same elements in the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device 10.

Referring to FIG. 1, the display device 10 may include a display panel 100, a gate driver 200, a data driver 300, a timing controller 400, a load calculator 500, a first gain provider 600, a second gain provider 700, and a grayscale converter 800.

The display panel 100 may include various display elements such as an organic light-emitting diode ("OLED") or the like. Hereinafter, the display panel 100 including the organic light-emitting diode as a display element will be described for convenience. However, the disclosure is not limited thereto, and the display panel 100 may include various display elements such as a liquid crystal display ("LCD") element, an electrophoretic display ("EPD") element, an inorganic light-emitting diode, a quantum dot light-emitting diode ("QLED"), or the like.

The display panel 100 may include a plurality of pixels PX. The pixels PX may receive gate signals GS and data signals DS. The pixels PX may emit light based on the gate signals GS and the data signals DS. In an embodiment, the pixels PX may include red pixels, green pixels, and blue pixels.

The gate driver 200 (or a scan driver) may generate the gate signals GS (or scan signals) based on gate control signals, and may provide the gate signals GS to the pixels PX. The gate control signals may include a gate start signal, a gate clock signal, or the like.

The data driver 300 (or a source driver) may generate the data signals DS based on grayscale values of an output image IMG2 and data control signals, and may provide the data signals DS to pixels PX. The data control signals may include a data clock signal, a data enable signal, or the like.

The timing controller 400 may control driving of the gate driver 200 and driving of the data driver 300. The timing controller 400 may provide the gate control signals to the gate driver 200, and may provide the grayscale values of the output image IMG2 and the data control signals to the data driver 300.

The load calculator 500 may calculate a load LD of an input image IMG1. The load LD may correspond to grayscale values of the input image IMG1 of one frame. In an embodiment, the load LD may be an average of the grayscale values of the input image IMG1 of one frame. In another embodiment, the load LD may be the sum of the grayscale values of the input image IMG1 of one frame.

The first gain provider 600 may control a first gain value SSG1 during a first display period in which a still image is displayed. The first gain provider 600 may determine whether the input image IMG1 is the still image based on the load LD of the input image IMG1, and may control the first gain value SSG1 based on the load LD of the input image IMG1 and a second gain value SSG2. In an embodiment, the first gain value SSG1 may be greater than or equal to 0 and less than or equal to 1. In another embodiment, the first gain value SSG1 may be greater than or equal to 0% and less than or equal to 100%.

The second gain provider 700 may control the second gain value SSG2 during a second display period in which a moving image including a still area is displayed. The second gain provider 700 may determine whether the input image IMG1 is the moving image including the still area based on the input image IMG1, and may control the second gain value SSG2 based on the input image IMG1 and the load LD of the input image IMG1. In an embodiment, the second gain value SSG2 may be greater than or equal to 0 and less than or equal to 1. In another embodiment, the second gain value SSG2 may be greater than or equal to 0% and less than or equal to 100%.

The grayscale converter 800 may apply the first gain value SSG1 or the second gain value SSG2 to the input image IMG1 to generate the output image IMG2. The grayscale converter 800 may scale the grayscale values of the input image IMG1 using the first gain value SSG1 or the second gain value SSG2 to generate grayscale values of the output image IMG2. When the input image IMG1 is the still image, the grayscale converter 800 may apply the first gain value SSG1 to the input image IMG1 to generate the output image IMG2. When the input image IMG1 is the moving image including the still area, the grayscale converter 800 may apply the second gain value SSG2 to the input image IMG1 to generate the output image IMG2.

Figure 2:
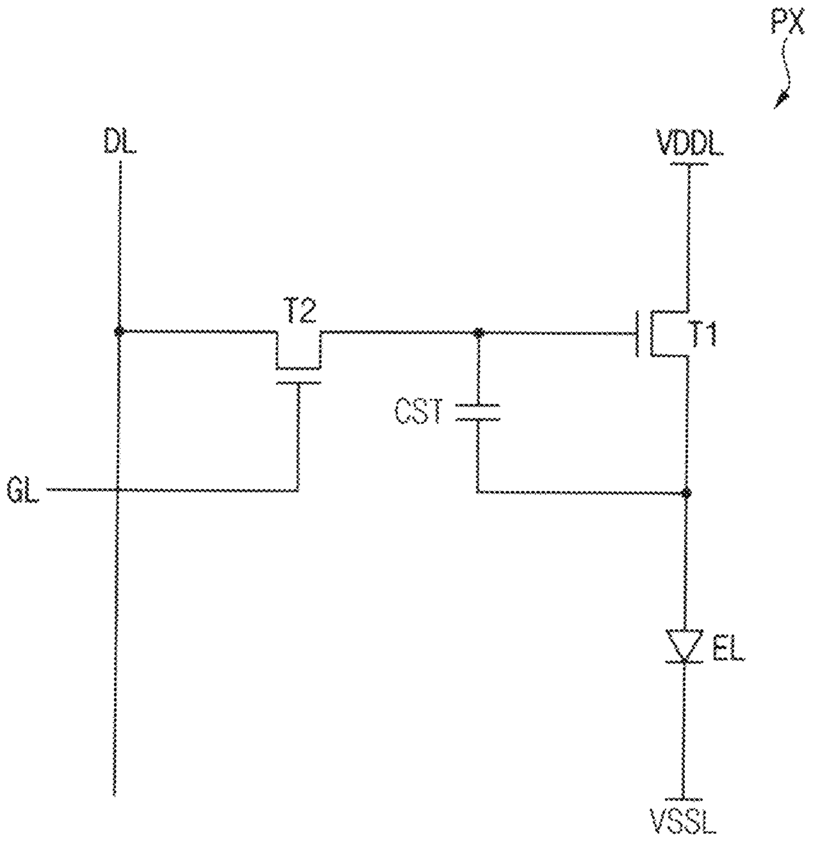
FIG. 2 is a circuit diagram illustrating a pixel included in the display device in FIG. 1.

FIG. 2 is a circuit diagram illustrating the pixel PX included in the display device 10 in FIG. 1.

Referring to FIG. 2, the pixel PX may include a first transistor T1, a second transistor T2, a storage capacitor CST, and a light-emitting element EL.

The first transistor T1 may provide a driving current to the light-emitting element EL. A first electrode of the first transistor T1 may be connected to a first power line VDDL that transmits a first driving voltage, and a second electrode of the first transistor T1 may be connected to a first electrode of the light-emitting element EL. A gate electrode of the first transistor T1 may be connected to a second electrode of the second transistor T2.

The second transistor T2 may provide the data signal DS to the gate electrode of the first transistor T1 in response to the gate signal GS. A first electrode of the second transistor T2 may be connected to a data line DL that transmits the data signal DS, and a second electrode of the second transistor T2 may be connected to the gate electrode of the first transistor T1. A gate electrode of the second transistor T2 may be connected to a gate line GL that transmits the gate signal GS.

FIG. 2 illustrates an embodiment in which each of the first transistor T1 and the second transistor T2 is an n-channel metal-oxide-semiconductor ("NMOS") transistor, but the disclosure is not limited thereto. In another embodiment, at least one of the first transistor T1 and the second transistor T2 may be a p-channel metal-oxide-semiconductor ("PMOS") transistor.

The storage capacitor CST may maintain a voltage between the second electrode and the gate electrode of the first transistor T1. A first electrode of the storage capacitor CST may be connected to the gate electrode of the first transistor T1, and a second electrode of the storage capacitor CST may be connected to the second electrode of the first transistor T1.

FIG. 2 illustrates an embodiment in which the pixel PX includes two transistors and one capacitor, but the disclosure is not limited thereto. In another embodiment, the pixel PX may include three or more transistors and/or two or more capacitors.

The light-emitting element EL may emit light based on the driving current. A first electrode of the light-emitting element EL may be connected to the second electrode of the first transistor T1, and a second electrode of the light-emitting element EL may be connected to a second power line VSSL that transmits a second driving voltage. In an embodiment, the first driving voltage may be greater than the second driving voltage, for example.

Figure 3:
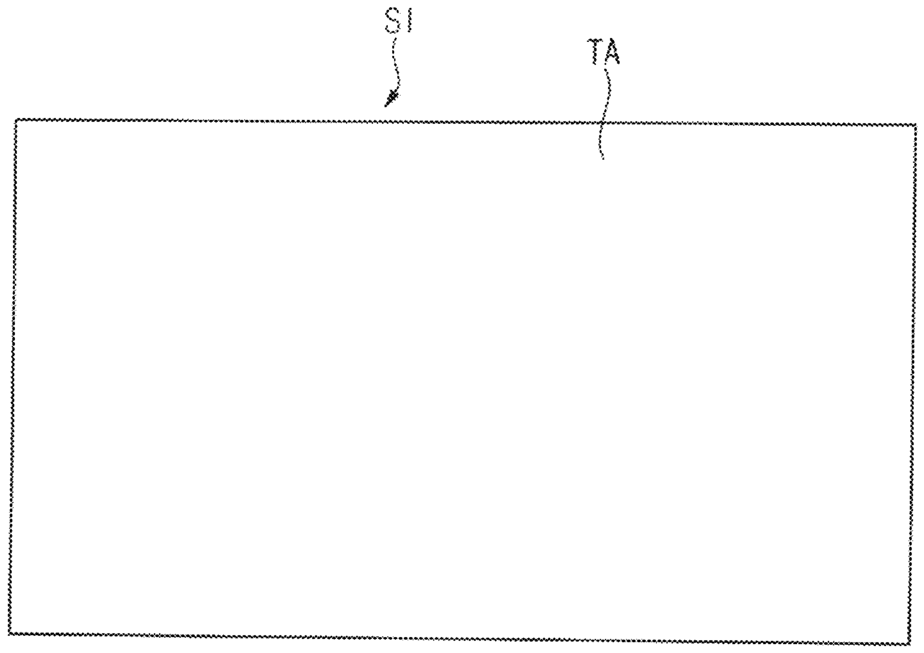
FIG. 3 is a diagram for describing an embodiment of a still image.
Figure 4:
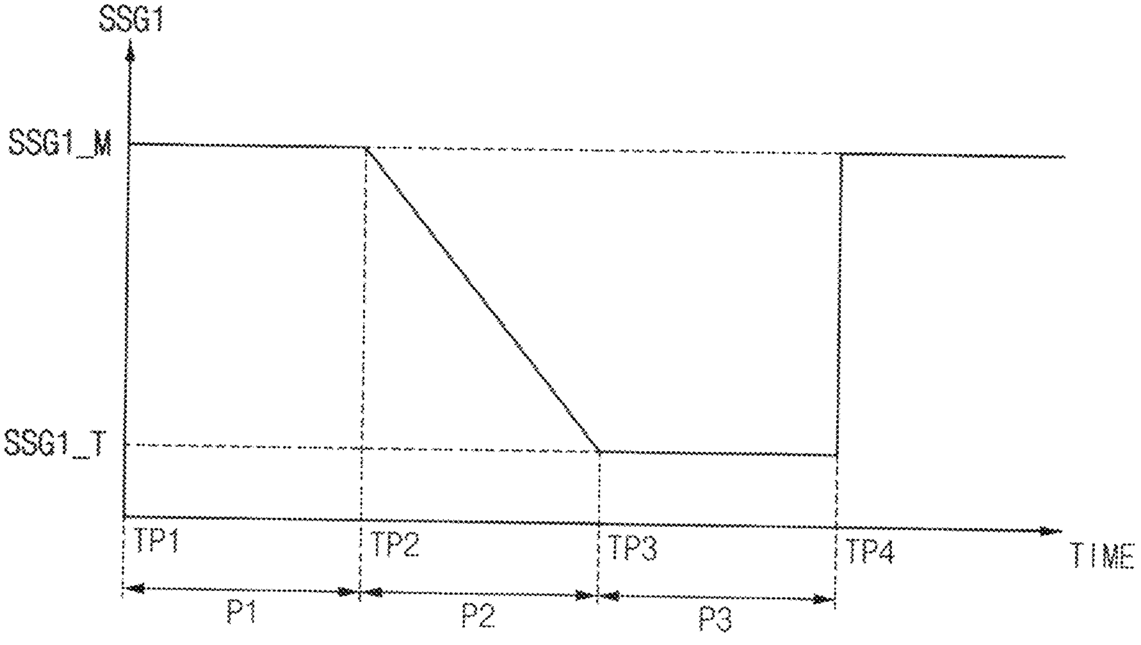
FIG. 4 is a diagram for describing an operation of a first gain provider included in the display device in FIG. 1.

FIG. 3 is a diagram for describing an embodiment of the still image SI. FIG. 4 is a diagram for describing an operation of the first gain provider 600 included in the display device 10 in FIG. 1.

Referring to FIGS. 3 and 4, the first gain provider 600 (refer to FIG. 1) may determine the input image IMG1 (refer to FIG. 1) as the still image SI at a first time point TP1. The still image SI may be an image in which an entirety of an area TA of the input image IMG1 is still.

The first gain provider 600 may maintain the first gain value SSG1 as a maximum gain value SSG1_M during a first period P1 from the first time point TP1 to a second time point TP2. In an embodiment, the maximum gain value SSG1_M may be 1. FIG. 4 illustrates a case where the first gain value SSG1 is the maximum gain value SSG1_M at the first time point TP1, but the first gain value SSG1 at the first time point TP1 may be different according to the input image IMG1 before the first time point TP1. In an embodiment, when the first gain value SSG1 is less than the maximum gain value SSG1_M at the first time point TP1, the first gain provider 600 may increase the first gain value SSG1 to the maximum gain value SSG1_M during the first period P1, for example.

The first gain provider 600 may decrease the first gain value SSG1 during a second period P2 from the second time point TP2 to a third time point TP3. The first gain provider 600 may linearly decrease the first gain value SSG1 from the maximum gain value SSG1_M to a threshold gain value SSG1_T. The threshold gain value SSG1_T may be a predetermined value. As the first gain value SSG1 linearly decreases during the second period P2, a luminance of the still image SI may linearly decrease, and a user may not recognize flicker according to the decrease in luminance of the still image SI.

The first gain provider 600 may maintain the first gain value SSG1 as the threshold gain value SSG1_T during a third period P3 from the third time point TP3 to a fourth time point TP4. As the first gain value SSG1 maintains as the threshold gain value SSG1_T during the third period P3, the still image SI having a low luminance may be displayed. Accordingly, an afterimage of the display device 10 may be prevented, and power consumption of the display device 10 may be reduced.

The first gain provider 600 may control the first gain value SSG1 as the maximum gain value SSG1_M at the fourth time point TP4 when the input image IMG1 changes. Accordingly, an image having an original luminance may be displayed from the fourth time point TP4.

Figure 5:
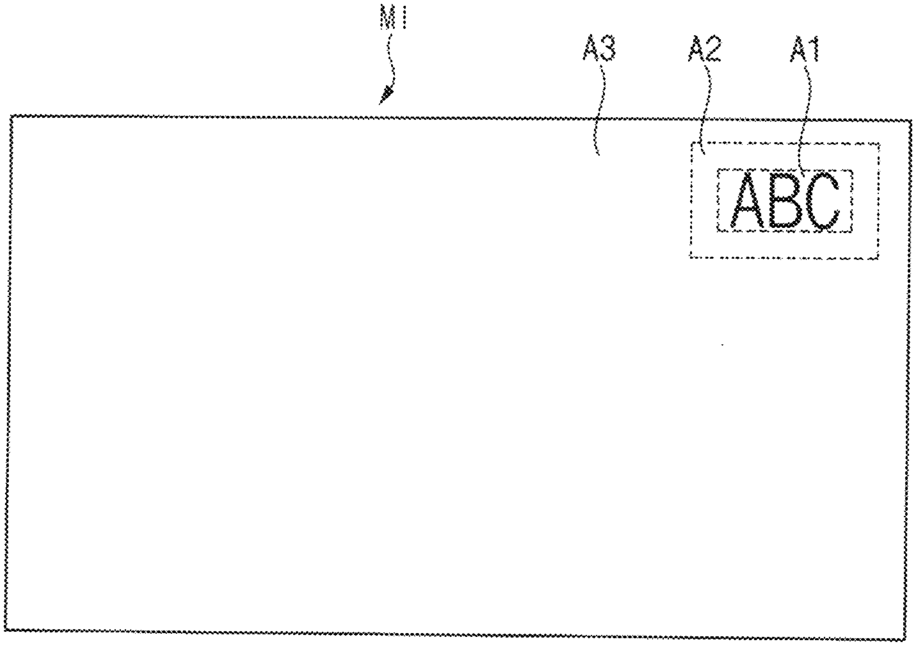
FIG. 5 is a diagram for describing an embodiment of a moving image including a still area.
Figure 6:
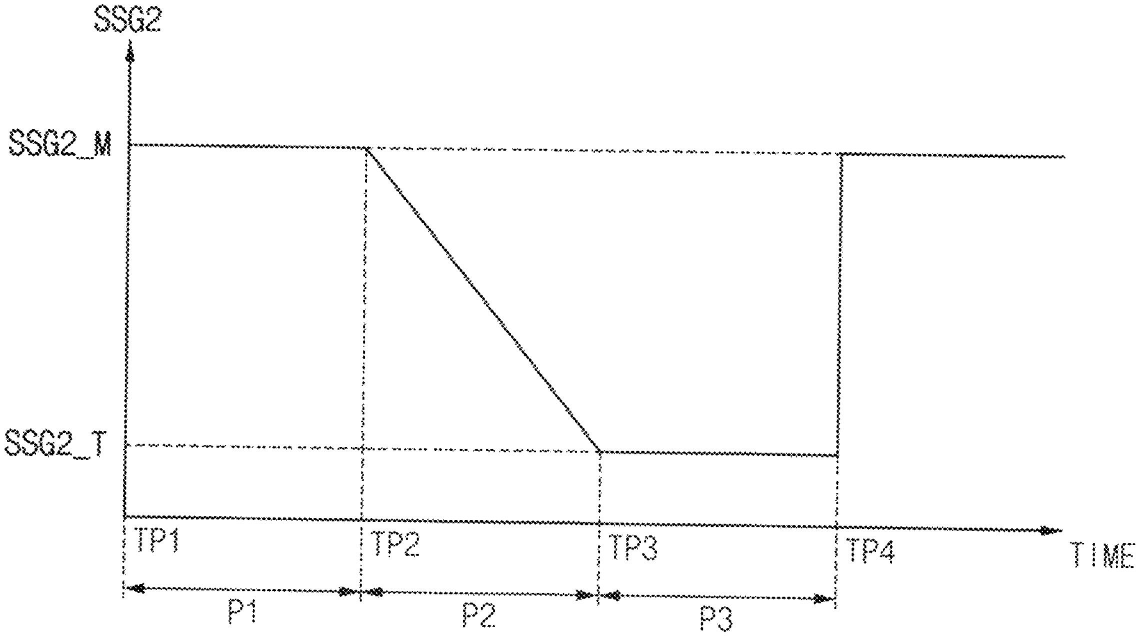
FIG. 6 is a diagram for describing an operation of a second gain provider included in the display device in FIG. 1.

FIG. 5 is a diagram for describing an embodiment of the moving image MI including the still area A1. FIG. 6 is a diagram for describing an operation of the second gain provider 700 included in the display device 10 in FIG. 1.

Referring to FIGS. 5 and 6, the second gain provider 700 (refer to FIG. 1) may determine the input image IMG1 (refer to FIG. 1) as the moving image MI including the still area A1 at a first time point TP1. In an embodiment, the still area A1 may display a still portion such as a logo, a banner, or the like of the moving images MI. In an embodiment, the still area A1 may be a quadrangular (e.g., rectangular) area surrounding an outline of the logo. However, the disclosure is not limited thereto, and the still area A1 may have various other shapes such as a circular shape, a polygonal shape, or the like. In another embodiment, the still area A1 may be an area having the same shape as that of the outline of the logo, for example.

The moving image MI may further include a peripheral area A2 surrounding the still area A1 and a remaining area A3 excluding the still area A1 and the peripheral area A2 among an entirety of the area of the moving image MI. That is, the still area A1, the peripheral area A2 and the remaining area A3 together may define the entirety of the area of the moving image MI. The peripheral area A2 and the remaining area A3 may display a moving portion of the moving image MI.

The second gain provider 700 may maintain the second gain value SSG2 as a maximum gain value SSG2_M during a first period P1 from the first time point TP1 to a second time point TP2. In an embodiment, the maximum gain value SSG2_M may be 1. FIG. 6 illustrates a case where the second gain value SSG2 is the maximum gain value SSG2_M at the first time point TP1, but the second gain value SSG2 at the first time point TP1 may be different according to the input image IMG1 before the first time point TP1. In an embodiment, when the second gain value SSG2 is less than the maximum gain value SSG2_M at the first time point TP1, the second gain provider 700 may increase the second gain value SSG2 to the maximum gain value SSG2_M during the first period P1, for example.

The second gain provider 700 may decrease the second gain value SSG2 during a second period P2 from the second time point TP2 to a third time point TP3. The second gain provider 700 may linearly decrease the second gain value SSG2 from the maximum gain value SSG2_M to a threshold gain value SSG2_T. The second gain provider 700 may determine the threshold gain value SSG2_T based on a difference between an average grayscale value of the still area A1 and an average grayscale value of the peripheral area A2 and a load LD (refer to FIG. 1) of the input image IMG1. The average grayscale value of the still area A1 may be an average of grayscale values of the still area A1, and the average grayscale value of the peripheral area A2 may be an average of grayscale values of the peripheral area A2. As the second gain value SSG2 linearly decreases during the second period P2, a luminance of the moving image MI including the still area A1 may linearly decrease, and the user may not recognize flicker according to the decrease in luminance of the moving image MI.

The second gain provider 700 may determine the threshold gain value SSG2_T to be smaller as the difference between the average grayscale value of the still area A1 and the average grayscale value of the peripheral area A2 increases. As the difference between the average grayscale value of the still area A1 and the average grayscale value of the peripheral area A2 increases, the degree of afterimage generation may increase. The threshold gain value SSG2_T may be determined to be smaller as the difference between the average grayscale value of the still area A1 and the average grayscale value of the peripheral area A2 increases, so that an afterimage of the display device 10 may be prevented.

The second gain provider 700 may determine the threshold gain value SSG2_T to be smaller as the load LD of the input image IMG1 decreases. As the load LD of the input image IMG1 decreases, the user may be insensitive to the luminance change. The threshold gain value SSG2_T may be determined to be smaller as the load LD of the input image IMG1 decreases, so that power consumption of the display device 10 may be reduced.

The second gain provider 700 may maintain the second gain value SSG2 as the threshold gain value SSG2_T during a third period P3 from the third time point TP3 to a fourth time point TP4. As the second gain value SSG2 maintains as the threshold gain value SSG2_T during the third period P3, the moving image MI including the still area A1 having a low luminance may be displayed. Accordingly, an afterimage of the display device 10 may be prevented, and power consumption of the display device 10 may be reduced.

The second gain provider 700 may control the second gain value SSG2 to the maximum gain value SSG2_M at the fourth time point TP4 when the input image IMG1 changes. Accordingly, an image having an original luminance may be displayed from the fourth time point TP4.

Figure 7:
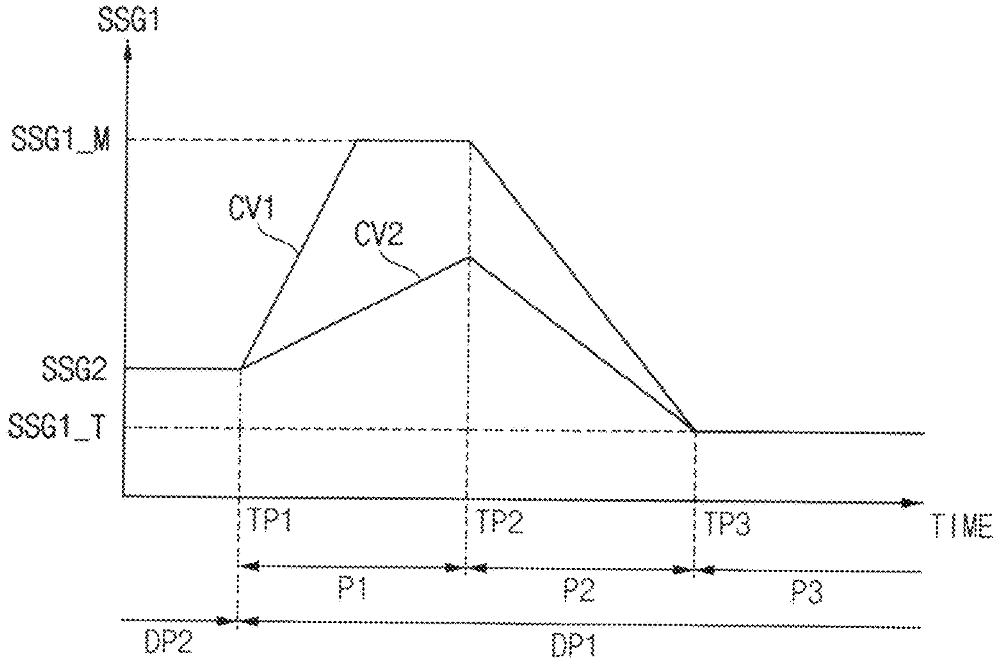
FIG. 7 is a diagram for describing a comparative example of an operation of a first gain provider.

FIG. 7 is a diagram for describing a comparative example of an operation of a first gain provider.

Referring to FIG. 7, when the display device 10 (refer to FIG. 1) displays the still image SI after displaying the moving image MI including the still area A1 (refer to FIG. 5), a first gain provider in a comparative example may linearly increase the first gain value SSG1 to the maximum gain value SSG1_M during a first period P1 from a first time point TP1 when a second display period DP2 in which the moving image MI including the still area A1 is displayed changes to a first display period DP1 in which the still image SI is displayed to a second time point TP2 at which the first gain value SSG1 starts to decrease from the maximum gain value SSG1_M. Since the second gain provider determines the second gain value SSG2 during the second display period DP2 based on the difference between the average grayscale value of the still area A1 and the average grayscale value of the peripheral area A2 and the load LD of the input image IMG1, the second gain value SSG2 at the first time point TP1 may be less than the maximum gain value SSG1_M. The first gain provider may increase the first gain value SSG1 to the maximum gain value SSG1_M during the first period P1 to display the still image SI having an original luminance. An increase rate of the first gain value SSG1 during the first period P1 may be predetermined.

When the first gain provider increases the first gain value SSG1 along a first curve CV1 having a relatively large slope during the first period P1 (in other words, when the increase rate of the first gain value SSG1 is relatively large during the first period P1), the first gain value SSG1 may reach the maximum gain value SSG1_M before the second time point TP2, and may maintain as the maximum gain value SSG1_M until the second time point TP2, and accordingly, power consumption of the display device 10 may increase. When the first gain provider increases the first gain value SSG1 along a second curve CV2 having a relatively small slope during the first period P1 (in other words, when the increase rate of the first gain value SSG1 is relatively small during the first period P1), the first gain value SSG1 may have a value less than the maximum gain value SSG1_M at the second time point TP2, and accordingly, the display device 10 may not display an image having the original luminance.

The first gain provider may decrease the first gain value SSG1 during the second period P2 from the second time point TP2 to the third time point TP3. The first gain provider may linearly decrease the first gain value SSG1 from the first gain value SSG1 at the second time point TP2 to the threshold gain value SSG1_T. When the first gain provider increases the first gain value SSG1 along the first curve CV1 during the first period P1, the first gain provider may linearly decrease the first gain value SSG1 from the maximum gain value SSG1_M to the threshold gain value SSG1_T. When the first gain provider increases the first gain value SSG1 along the second curve CV2 during the first period P1, the first gain provider may linearly decrease the first gain value SSG1 from a gain value greater than the second gain value SSG2 at the first time point TP1 and less than the maximum gain value SSG1_M to the threshold gain value SSG1_T. The first gain provider may maintain the first gain value SSG1 as the threshold gain value SSG1_T during the third period P3 starting from the third time point TP3.

Figure 8:
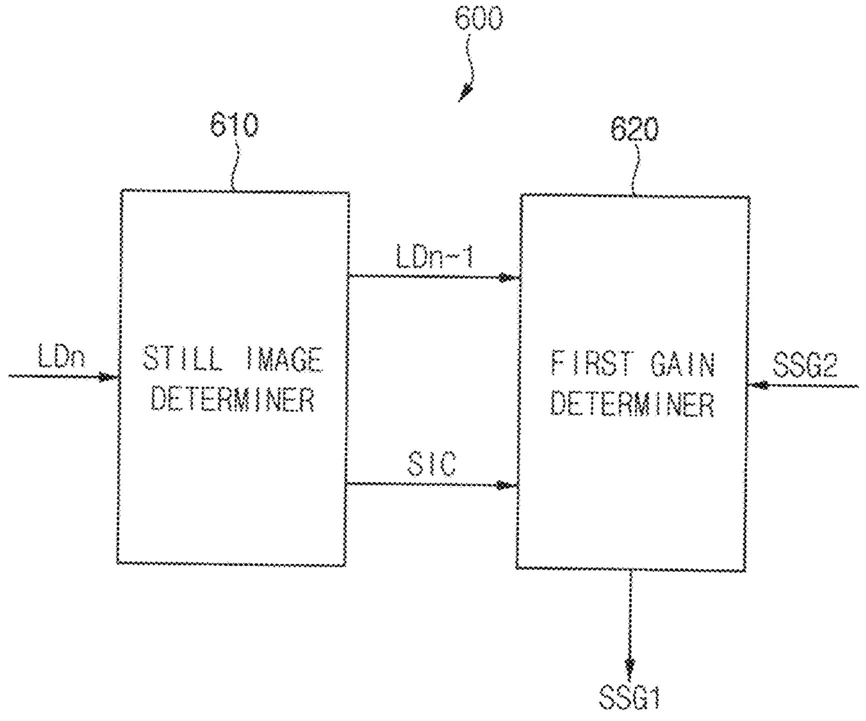
FIG. 8 is a block diagram illustrating a first gain provider included in the display device in FIG. 1.
Figure 9:
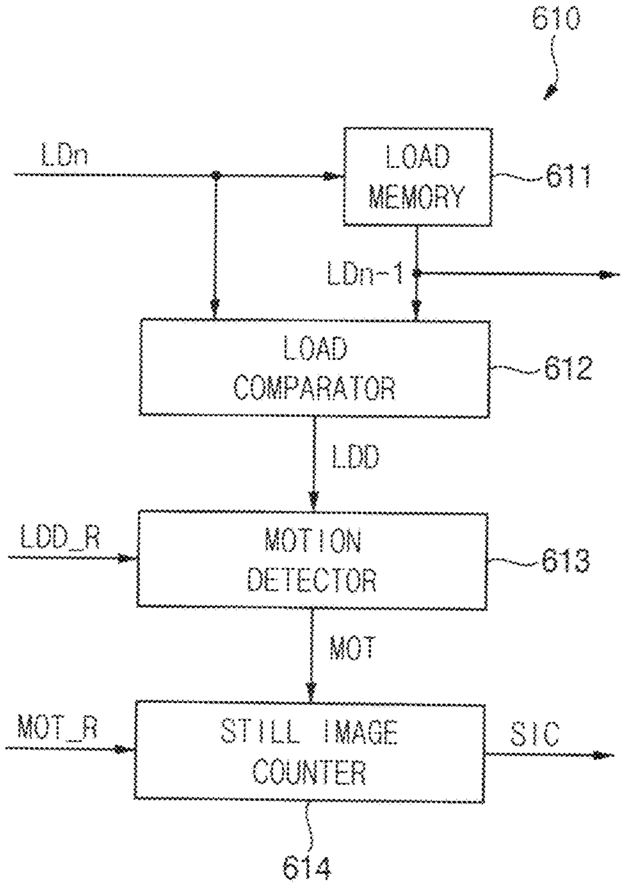
FIG. 9 is a block diagram illustrating a still image determiner included in the first gain provider in FIG. 8.
Figure 10:
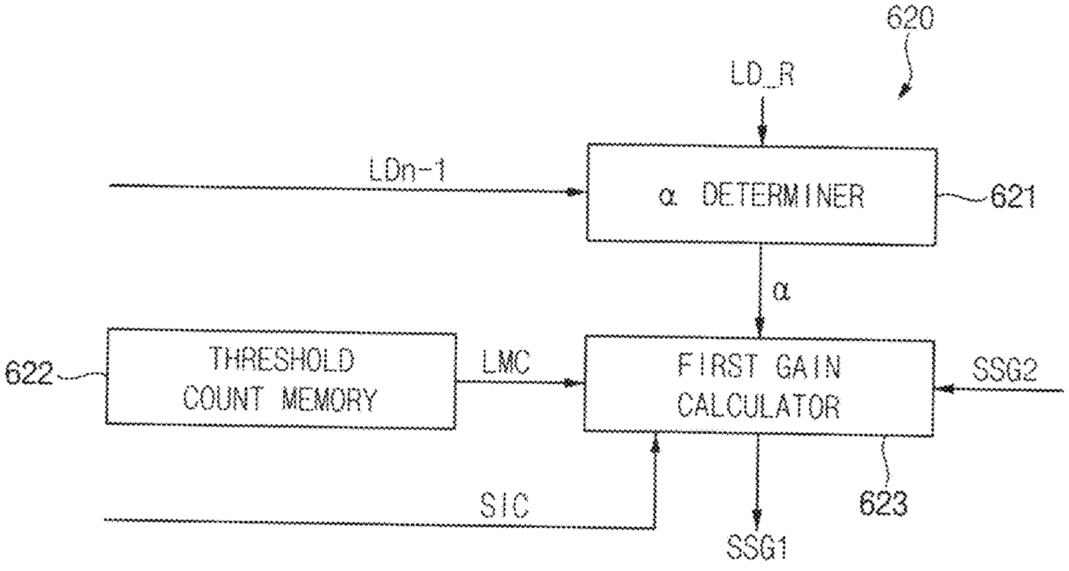
FIG. 10 is a block diagram illustrating a first gain determiner included in the first gain provider in FIG. 8.
Figure 11:
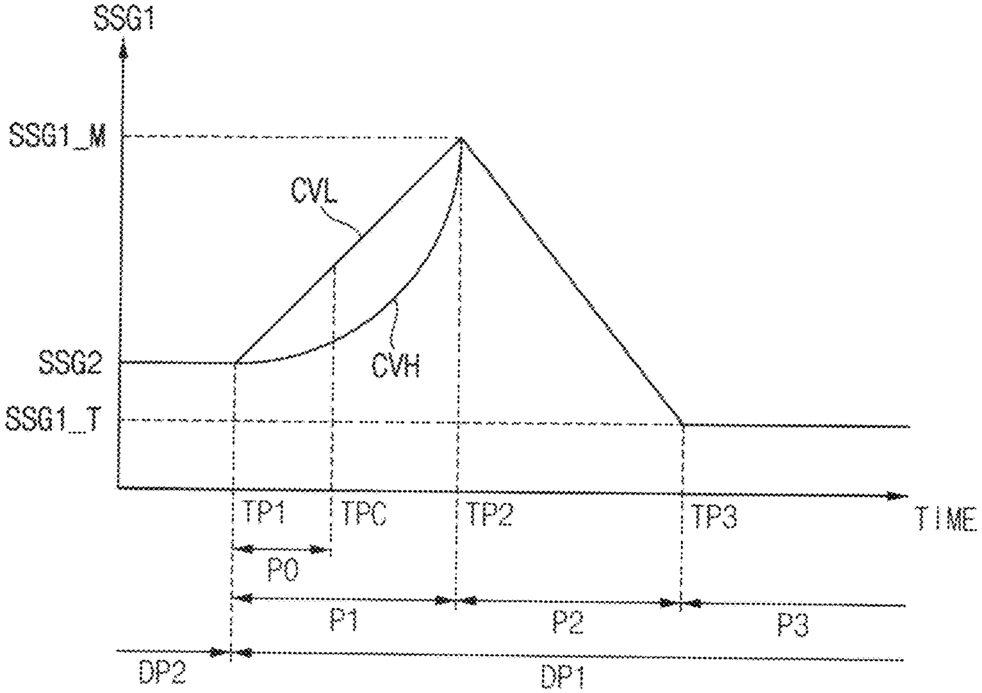
FIG. 11 is a diagram for describing an operation of the first gain provider in FIG. 8.

FIG. 8 is a block diagram illustrating the first gain provider 600 included in the display device 10 in FIG. 1. FIG. 9 is a block diagram illustrating a still image determiner 610 included in the first gain provider 600 in FIG. 8. FIG. 10 is a block diagram illustrating a first gain determiner 620 included in the first gain provider 600 in FIG. 8. FIG. 11 is a diagram for describing an operation of the first gain provider 600 in FIG. 8.

Referring to FIGS. 8, 9, 10, and 11, the first gain provider 600 may include the still image determiner 610 and the first gain determiner 620. The still image determiner 610 may determine whether the input image IMG1 is the still image SI. When the display device 10 displays the still image SI after displaying the moving image MI including the still area A1, the still image determiner 610 may determine the input image IMG1 as the still image SI from the first time point TP1 when the second display period DP2 in which the moving image MI including the still area A1 is displayed changes to the first display period DP1 in which the still image SI is displayed.

The still image determiner 610 may include a load memory 611, a load comparator 612, a motion detector 613, and a still image counter 614. The load memory 611 may store the load LD (refer to FIG. 1) of the input image IMG1 (refer to FIG. 1).

The load comparator 612 may calculate a load difference LDD between a load LDn−1 of the input image IMG1 of the previous frame and a load LDn of the input image IMG1 of the current frame. When the load LDn of the input image IMG1 of the current frame is provided from the load calculator 500 (refer to FIG. 1) to the load comparator 612, the load LDn−1 of the input image IMG1 of the previous frame may be provided from the load memory 611 to the load comparator 612, and the load LD stored in the load memory 611 may be updated with the load LDn of the input image IMG1 of the current frame. The load difference LDD may be a difference between the load LDn−1 of the input image IMG1 of the previous frame and the load LDn of the input image IMG1 of the current frame. The motion detector 613 may detect a motion MOT of the input image IMG1 based on the load difference LDD. The motion MOT may mean a degree of change of the input image IMG1 of the current frame with respect to the input image IMG1 of the previous frame. In an embodiment, the motion detector 613 may determine the motion MOT to be larger as the load difference LDD increases, for example. In an embodiment, the motion detector 613 may receive a reference load difference LDD_R for removing noise due to an image change between the input image IMG1 of the previous frame and the input image IMG1 of the current frame, and may determine the motion MOT of the noise-removed input image IMG1 by a value obtained by adding or subtracting the reference load difference LDD_R to the load difference LDD.

The still image counter 614 may increase a still image count SIC when the motion MOT of the input image IMG1 is less than a reference motion MOT_R. The reference motion MOT_R may be a criterion for determining whether the input image IMG1 is a still image or a moving image. When the motion MOT of the input image IMG1 is less than the reference motion MOT_R, it may be determined that the input image IMG1 is a still image, and accordingly, the still image count SIC indicating the number of frames in which the still image is displayed may be increased. The still image counter 614 may increase the still image count SIC from the first time point TP1.

The first gain determiner 620 may determine the first gain value SSG1 during the first period P1 from the first time point TP1 to the second time point TP2 at which the first gain value SSG1 starts to decrease from the maximum gain value SSG1_M. The first gain determiner 620 may linearly or exponentially increase the first gain value SSG1 to the maximum gain value SSG1_M during the first period P1 based on the load LD of the input image IMG1. The first gain determiner 620 may calculate the first gain value SSG1 during the first period P1 by Equation 1 below.

$$SSG1=SSG2\_T1+(SSG1\_M-SSG2\_T1)*(P0/P1)^{\alpha} \quad \text{[Equation 1]}$$

In Equation 1, SSG1 denotes the first gain value at the current time point TPC, SSG2_T1 denotes the second gain value at the first time point TP1, SSG1_M denotes the maximum gain value, P0 denotes a period from the first time point TP1 to the current time point TPC, P1 denotes a period from the first time point TP1 to the second time point TP2, and α denotes a real number greater than or equal to 1.

In an embodiment, when the load LD of the input image IMG1 is less than or equal to the reference load LD_R, the first gain determiner 620 may linearly increase the first gain value SSG1 during the first period P1 along a first curve CVL corresponding to a case where the α is 1. When the load LD of the input image IMG1 is greater than the reference load LD_R, the first gain determiner 620 may exponentially increase the first gain value SSG1 during the first period P1 along a second curve CVH corresponding to a case where the α is greater than 1. The reference load LD_R may be a minimum value of the load LD of the input image IMG1 for which power consumption of the display device 10 needs to be reduced, and the reference load LD_R may be predetermined.

The first gain determiner 620 may include an α determiner 621, a threshold count memory 622, and a first gain calculator 623. The α determiner 621 may determine the α based on the load LD of the input image IMG1. The α determiner 621 may determine the α to be larger as the load LD of the input image IMG1 increases.

In an embodiment, the α determiner 621 may receive the reference load LD_R, may determine the α to be 1 when the load LD of the input image IMG1 is less than or equal to the reference load LD_R, may determine the α to be a value greater than 1 when the load LD of the input image IMG1 is greater than the reference load LD_R. In an embodiment, the α may be maintained as 1 as the load LD of the input image IMG1 increases when the load LD of the input image IMG1 is greater than or equal to a minimum load and less than or equal to the reference load LD_R, and the α may increase from 1 as the load LD of the input image IMG1 increases when the load LD of the input image IMG1 is greater than the reference load LD_R, for example.

In another embodiment, the α determiner 621 may determine the α as 1 when the load LD of the input image IMG1 is the minimum load, may determine the α as a maximum value greater than 1 when the load LD of the input image IMG1 is the maximum load, and may determine the α as a value greater than 1 and less than the maximum value when the load LD of the input image IMG1 is greater than the minimum load and less than the maximum load. In an embodiment, the α may increase from 1 to the maximum value as the load LD of the input image IMG1 increases from the minimum load to the maximum load, for example.

The threshold count memory 622 may store a threshold count LMC for determining the second time point TP2. The threshold count LMC may be the number of frames corresponding to the first period P1. The threshold count memory 622 may provide the threshold count LMC to the first gain calculator 623.

The first gain calculator 623 may calculate the first gain value SSG1 at the current time point TPC based on Equation 1. The first gain calculator 623 may determine the second gain value SSG2_T1 at the first time point TP1 from the second gain value SSG2 receiving from the second gain provider 700, and may determine a zero$^{th}$ period P0 from the first time point TPC1 to the current time point TPC using the still image count SIC. The first gain calculator 623 may determine the first period P1 from the threshold count LMC receiving from the threshold count memory 622, and may receive the α from the α determiner 621. The maximum gain value SSG1_M may be predetermined.

When the load LD of the input image IMG1 is large, the first gain value SSG1 may exponentially increase to the maximum gain value SSG1_M from the first time point TP1 when the second display period DP2 in which the moving image MI including the still area SI is displayed changes to the first display period DP1 in which the still image SI is displayed to the second time point TP2 at which the first gain value SSG1 starts to decrease from the maximum gain value SSG1_M, so that power consumption of the display device 10 may be reduced. Further, the first gain value SSG1 may become the maximum gain value SSG1_M at the second time point TP2, so that the input image IMG1 may have an original luminance at the second time point TP2, and accordingly, image quality of the still image SI may be improved.

Figure 12:
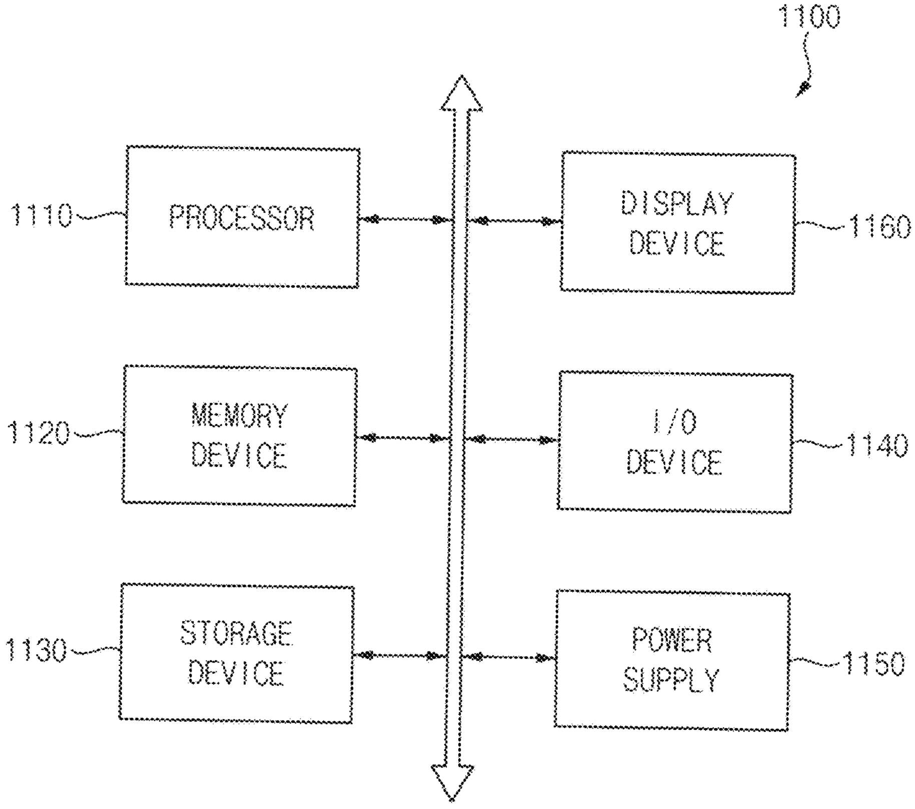
FIG. 12 is a block diagram illustrating an embodiment of an electronic apparatus including a display device.

FIG. 12 is a block diagram illustrating an embodiment of an electronic apparatus 1100 including a display device 1160.

Referring to FIG. 12, the electronic apparatus 1100 may include a processor 1110, a memory device 1120, a storage device 1130, an input/output ("I/O") device 1140, a power supply 1150, and a display device 1160. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a compact disc read-only memory ("CD-ROM") device, or the like. The I/O device 1140 may include an input device such as a keyboard, a keypad, a touchpad, a touch-screen, a mouse device, etc., and an output device such as a speaker, a printer, etc. The power supply 1150 may supply a power desired for the operation of the electronic apparatus 1100. The display device 1160 may be coupled to other components via the buses or other communication links.

In the display device 1160, when a load of the still image is large, a first gain value may exponentially increase to a maximum gain value from a first time point when a period in which a moving image including a still area is displayed changes to a period in which the still image is displayed to a second time point at which the first gain value starts to decrease from the maximum gain value, so that power consumption of the display device may be reduced. Further, the still image may have an original luminance at the second time point, so that image quality of the still image may be improved.

The display device in the embodiments may be applied to a display device included in a computer, a notebook, a mobile phone, a smart phone, a smart pad, a portable media player ("PMP"), a personal digital assistance ("PDA"), an MP3 player, or the like.

Although the display devices and the methods of driving the display devices in the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a first gain provider which controls a first gain value during a first display period in which a still image is displayed;

a second gain provider which controls a second gain value during a second display period in which a moving image including a still area is displayed; and a grayscale converter which applies the first gain value or the second gain value to an input image and generates an output image, wherein the first gain provider linearly or exponentially increases the first gain value to a maximum gain value based on a load of the still image from a first time point when the second display period changes to the first display period to a second time point at which the first gain value starts to decrease from the maximum gain value.

2. The display device of claim 1, wherein the first gain provider linearly increases the first gain value from the first time point to the second time point when the load of the still image is less than or equal to a reference load, and wherein the first gain provider exponentially increases the first gain value from the first time point to the second time point when the load of the still image is greater than the reference load.

3. The display device of claim 1, wherein the first gain provider calculates the first gain value from the first time point to the second time point by Equation 1:

$$SSG1=SSG2\_T1+(SSG1\_M-SSG2\_T1)*(P0/P1)^{\alpha} \quad \text{[Equation 1]}$$

where SSG1 denotes the first gain value at a current time point, SSG2_T1 denotes the second gain value at the first time point, SSG1_M denotes the maximum gain value, P0 denotes a period from the first time point to the current time point, P1 denotes a period from the first time point to the second time point, and α denotes a real number greater than or equal to 1.

4. The display device of claim 3, wherein the first gain provider determines the α to be larger as the load of the still image increases.

5. The display device of claim 3, wherein the maximum gain value is 1.

6. The display device of claim 3, wherein the first gain provider includes:

a still image determiner which determines whether the input image is the still image; and a first gain determiner which determines the first gain value from the first time point to the second time point.

7. The display device of claim 6, wherein the still image determiner includes:

a load comparator which calculates a load difference between a load of the input image in a previous frame and a load of the input image in a current frame;

a motion detector which detects a motion of the input image based on the load difference; and a still image counter which increases a still image count when the motion of the input image is less than a reference motion.

8. The display device of claim 6, wherein the first gain determiner includes:

an α determiner which determines the α based on the load of the input image;

a threshold count memory which stores a threshold count for determining the second time point; and a first gain calculator which calculates the first gain value at the current time point based on the Equation 1.

9. The display device of claim 1, wherein the first gain provider linearly decreases the first gain value from the second time point to a third time point at which the first gain value is equal to a threshold gain value.

10. The display device of claim 9, wherein the first gain provider maintains the first gain value as the threshold gain value from the third time point.

11. The display device of claim 1, wherein the second gain provider determines the second gain value based on a difference between an average grayscale value in the still area and an average grayscale value in a peripheral area surrounding the still area and a load of the moving image.

12. The display device of claim 11, wherein the second gain provider determines the second gain value to be smaller as the difference between the average grayscale value in the still area and the average grayscale value in the peripheral area increases.

13. The display device of claim 11, wherein the second gain provider determines the second gain value to be smaller as the load of the moving image decreases.

14. A method of driving a display device controlling a first gain value during a first display period in which a still image is displayed and controlling a second gain value during a second display period in which a moving image including a still area is displayed, the method comprising:

linearly or exponentially increasing the first gain value to a maximum gain value based on a load of the still image from a first time point when the second display period changes to the first display period to a second time point at which the first gain value starts to decrease from the maximum gain value; and applying the first gain value or the second gain value to an input image to generate an output image.

15. The method of claim 14, wherein the first gain value linearly increases from the first time point to the second time point when the load of the still image is less than or equal to a reference load, and wherein the first gain value exponentially increases from the first time point to the second time point when the load of the still image is greater than the reference load.

16. The method of claim 14, wherein the first gain value from the first time point to the second time point is calculated by Equation 1:

$$SSG1=SSG2\_T1+(SSG1\_M-SSG2\_T1)*(P0/P1)^{\alpha} \quad \text{[Equation 1]}$$

where SSG1 denotes the first gain value at a current time point, SSG2_T1 denotes the second gain value at the first time point, SSG1_M denotes the maximum gain value, P0 denotes a period from the first time point to the current time point, P1 denotes a period from the first time point to the second time point, and α denotes a real number greater than or equal to 1.

17. The method of claim 16, wherein the α is determined to be larger as the load of the still image increases.

18. The method of claim 14, further comprising:

linearly decreasing the first gain value from the second time point to a third time point at which the first gain value is equal to a threshold gain value.

19. The method of claim 18, further comprising:

maintaining the first gain value as the threshold gain value from the third time point.

20. The method of claim 14, further comprising:

determining the second gain value based on a difference between an average grayscale value in the still area and an average grayscale value in a peripheral area surrounding the still area and a load of the moving image.

* * * * *